US010137506B2

(12) United States Patent
Capone (10) Patent No.: US 10,137,506 B2
(45) Date of Patent: Nov. 27, 2018

(54) DRILLING TOOL (71) Applicant: Natalino Capone, Montemiletto-Avellino (IT)

(72) Inventor: Natalino Capone, Montemiletto-Avellino (IT)

( * ) Notice: Subject to any disclaimer, the term of this patent is extended or adjusted under 35 U.S.C. 154(b) by 0 days.

(21) Appl. No.: 15/312,687

(22) PCT Filed: May 20, 2014

(86) PCT No.: PCT/IT2014/000138
§ 371 (c)(1),
(2) Date: Nov. 21, 2016

(87) PCT Pub. No.: WO2015/177814
PCT Pub. Date: Nov. 26, 2015

(65) Prior Publication Data
US 2017/0182565 A1    Jun. 29, 2017

(51) Int. Cl.
*B23B 51/02* (2006.01)

(52) U.S. Cl.
CPC .......... *B23B 51/02* (2013.01); *B23B 2215/04* (2013.01); *B23B 2222/04* (2013.01); *B23B 2222/88* (2013.01); *B23B 2226/275* (2013.01); *B23B 2251/204* (2013.01)

(58) Field of Classification Search
CPC . B23B 51/02; B23B 2215/04; B23B 2222/04; B23B 2222/88; B23B 2226/275; B23B 2251/204; B23B 2251/14; B23B 2251/18
See application file for complete search history.

(56) References Cited

U.S. PATENT DOCUMENTS

| 5,173,014 | A  | * | 12/1992 | Agapiou | ................ | B23B 51/02 408/230 |
| 8,052,361 | B2 | * | 11/2011 | Mir | ......................... | B23B 51/02 408/230 |
| 9,168,593 | B2 | * | 10/2015 | Saito | ....................... | B23B 51/00 |
| 2008/0069653 | A1 | * | 3/2008 | Glimpel | .................. | B23G 5/06 408/193 |

(Continued)

FOREIGN PATENT DOCUMENTS

JP    2010284783 A  * 12/2010
JP    2013252588 A  * 12/2013

*Primary Examiner* — Sunil K Singh
*Assistant Examiner* — Paul M Janeski (57) ABSTRACT A hand drilling tool of one or more elements coupled therebetween comprising:
a chuck (2) tightened in the spindle of a tool machine allowing the tool rotation;
an elongated point body (3) with tool diameter (2) having at least four helical grooves developing longitudinally on the point body and defining at least two primary cutters, and at least two secondary cutters; said two primary cutters forming a tip angle; said secondary cutters having a discharge surface S; said discharge surface S is shaped so as to create an interruption between the secondary cutters and the primary cutters by contributing to reduce the operator's effort, to reduce the temperature and to promote the discharge of the worked material. Said point body (3) is formed by a substantially cylindrical first portion and a substantially conical second portion with taper towards the end of the tool.

19 Claims, 6 Drawing Sheets (56) References Cited

U.S. PATENT DOCUMENTS

| | | | |
|---|---|---|---|
| 2010/0054881 A1* | 3/2010 | Thomas | B23B 51/02 408/1 BD |
| 2010/0158626 A1* | 6/2010 | Nakahata | B23B 35/005 408/230 |
| 2013/0039709 A1* | 2/2013 | Goh | B23B 51/02 408/1 R |

* cited by examiner

DRILLING TOOL

RELATED APPLICATIONS

This application is a National Phase of PCT Patent Application No. PCT/IT2014/000138 having International filing date of May 20, 2014, the contents of which are all incorporated by reference as if fully set forth herein in its entirety.

FIELD AND BACKGROUND

The present invention relates to a (hand) drilling tool, in particular it relates to a cutting tool made of hard metal with several (at least two) cutters for an element or more elements jointed therebetween of composite materials:
CFRP (Carbon Fiber Reinforced Plastic) composite material Such tool results to be suitable even for drilling (widening) in presence of pilot hole of:
light alloys (aluminium)
titanium alloys.

In the aviation manufacturing industry, the assembly method has been performed for more than 50 years by the procedures of:
drilling, boring and flaring
riveting It also represent the higher cost and time in production terms.

The aviation evolution then relates to the use of new materials, such as the carbon fibre or the light alloys reducing weight, by making the aircraft high-performing.

The target is then to use the best techniques to reduce time by increasing quality.

The carbon fibre, indeed, represents a current topic and the solutions to improve the working thereof have a strong importance as the world industrial field needs innovation as response to quality, production time and thus cost reduction.

Such tool results to be "inventive" as it meets the market demands, by performing the drilling procedure with these qualities:
finished hole in one single pass (according to the aviation tolerances);
high useful life;
keeping the finished hole within the aviation tolerances for a guaranteed useful life;
high reduction in the operator's effort and therefore improvement in ergonomics;
possibility of performing drilling even on NC (numeric control) machines.

Such procedures then have an important role in the productive process of assembling a plurality of components (portions), respectively jointed one another. In particular, the quality requested by the aviation procedures for the drilling working are very strict, therefore the resources to be used, both technological and human ones, must have high-performing features, with reference to the materials to be processed, and the hand tools to be used, such as for example the cutting tools dedicated to the various working to be performed. Another fundamental aspect relating the drilling process is the ever-increasing reduction in the working time and the useful life of the cutting tools. With specific reference to the aviation industry, wherein the decrease in weight and the increase in the used materials are searched for constantly, the composite materials assume ever-increasing importance and presence on the market.

With relation to the composite material the main features such as
High resistance;
High rigidity;
Lesser weight;
Long fatigue life;
Low thermal expansion;
High resistance to corrosion.

Said features are increasingly higher than those of the traditional metallic alloys still used in the aviation industry. In contrast to all this, this material has a lot of difficulties in the drilling working with traditional techniques and tools indeed due to the above-mentioned high technical features.

Therefore the main need in the aviation industry is the high quality of the working to the performed (for example drilling, riveting, etc.) in particular on composite materials, such as made of carbon fibre and/or glass fibre, and/or light alloys (Aluminium) and/or Titanium alloys and/or plastic materials.

The drilling is surely the most difficult and important process in the working of the composite materials. Therefore, it requires a specific equipment varying depending upon the shape and the sizes of the portions, if it is a half-assembled one or it is a particular single one, they can be processed with hand equipment such as drills (Hand Tool) and dedicated hand tools existing in the working stations or on numeric control tool machines by means of a dedicated part-program. Another aspect to be considered is the huge quantity of drillings to be performed on each assembled piece, therefore a greater longevity of the cutting tools is requested so as to perform a lesser number of tool changes.

With the technology development, in particular in the aviation field, ever-increasing structural elements are made of composite material. It is further provided the assembly between elements for implementing "packets" of elements coupled therebetween, with high thickness. In particular, the present invention is directed towards the drilling of single or coupled therebetween structural elements (packets) such as: bulkheads and ribs with section shaped like "L" or "H" or "U", longerons with section shaped like "Z", and "L" and "U", panels (skin) and reinforcements with single and double curvature.

The drillings of such packets are implemented, according to the project designs, by coupling elements made of the same material or elements made of different material. In the known art it is provided proceeding with the drilling of such packets by means of the technique of the subsequent passes, that is by proceeding to a sequence of drillings with various decreased diameters of the involved packet, spaced out by pauses to allow the cooling of the cutting tool and the stabilization of the material to be drilled, until implementing the hole with finished diameter. The cutting tools used in the known technique, in particular the so-called "lance-shaped points" have a reduced useful life, for example about 20 holes for drillings on CFRP-CFRP packets with thickness greater than 10 mm.

The most common drawbacks of drilling elements made of composite material are:
Surface delamination, FIG. 10/1, wherein the separation of the carbon ply is highlighted, due to the configuration of the cutting angles of the cutters of the lance-shaped point;
Breaking of the fibres, FIG. 10/2, wherein the breaking of the plies is highlighted, due to the cutters which do not have a suitable cutting angle;

Burnings of the inletting and outletting plies of the drilled element, FIG. 10/3, due to the heat accumulation of the cutting tool and to the high number of revolutions;

Ovalized hole, FIG. 10/4, due to the geometrical shape of the cutters of the cutting tool;

Poor duration of the tool due to the highly abrasive power of the material, in particular of the carbon-resin plies.

Notwithstanding there is a particular tendency to implementing elements in composite material, in aviation field, even other types of materials, such as light alloys (Al) and titanium alloys (Ti) are used. Therefore, the above-mentioned elements for example longerons, and/or bulkheads, and/or ribs and/or panels can be manufactured with the above-mentioned materials and they can be coupled by obtaining several combinations of packets both of the same type and not and different elements.

Therefore packets constituted by Aluminium/Carbon Aluminium/Titanium Carbon/Aluminium Aluminium/Aluminium etc. then alternated therebetween can be found.

SUMMARY OF THE INVENTION

Therefore, the technical problem placed and solved by the present invention is to provide a tool for drilling and boring in one single pass (one-shot) with finished diameter hole by complying with the requested quality requirements and allowing to obviate the drawbacks mentioned above with reference to the known art.

Such problem is solved by a cutting tool for drilling and boring, according to claim 1.

Preferred features of the present invention are present in the depending claims of the same.

Advantageously, the cutting tool for drilling according to a first preferred embodiment of the invention allows obtaining a finished hole in an element of composite material through a single drilling procedure and through the help of a single cutting tool (the so-called one-shot working). In particular, the implemented hole with finished diameter show neither delamination nor burning on the inletting and outletting surface of the drilled element, and the fibre cutting is sharp on the surface of the performed hole, furthermore the hole does not result to be ovalized in all its length. In this way, said invention reduces the need of having recourse to a certain number of tools with finished diameter, with consequent economical advantages in terms of cycle time and logistic advantages in terms of purchase, storage and handling of more cutting tools for each size (diameter) of the hole to be performed. Furthermore the particular geometrical shape of the cutting tool for drilling and boring, in fact, allows to reduce considerably the operator's effort in the hand working, with consequent advantages both in terms of working time and working quality of the operators.

In particular, by means of the first preferred embodiment of the invention the performing of the drilling working is made possible even without the use of outer bushings, and even in absence of pre-existing holes with a diameter with smaller size on the element to be drilled with finished diameter.

The particular shape of the tool allows drilling elements made of both composite material and other types of materials such as light alloys (Aluminium) and titanium alloys by obtaining from a hole with smaller diameter existing on an element a hole with finished diameter according to the aviation quality requirements. The same result can be obtained even with the so-called "packets" of dissimilar materials such as for example Aluminium/Carbon and/or Titanium/Carbon. Only for the light alloys or titanium alloys, for the geometrical particular feature of the head the drilling (one-shot) with finished diameter is provided by starting from a decreased hole (pre-hole) allowing not to ruin the head of the tool.

Other advantages, features and use modes of the present invention will result evident from the following detailed description of some embodiments, shown by way of example and not for limitative purpose.

In particular, in the following illustration, a particular application in aviation field of the present invention will be referred to, by the way being clear that the present invention could however find application in other and different application fields, wherein there is the same technical problem.

BRIEF DESCRIPTION OF THE SEVERAL VIEWS OF THE DRAWINGS

The figures of the enclosed drawings will be referred to, wherein.

DESCRIPTION OF SPECIFIC EMBODIMENTS OF THE INVENTION

Figure 1:
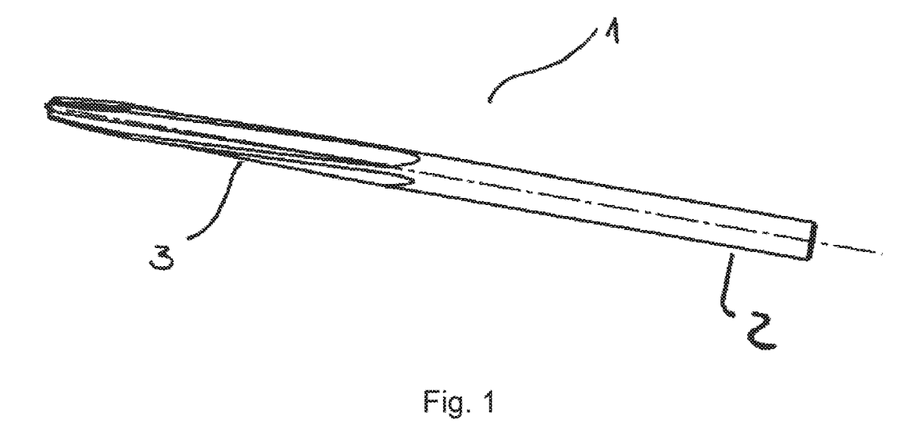
FIG. 1 shows a perspective view of a preferred embodiment of the drilling tool according to the present invention.
Figure 2:
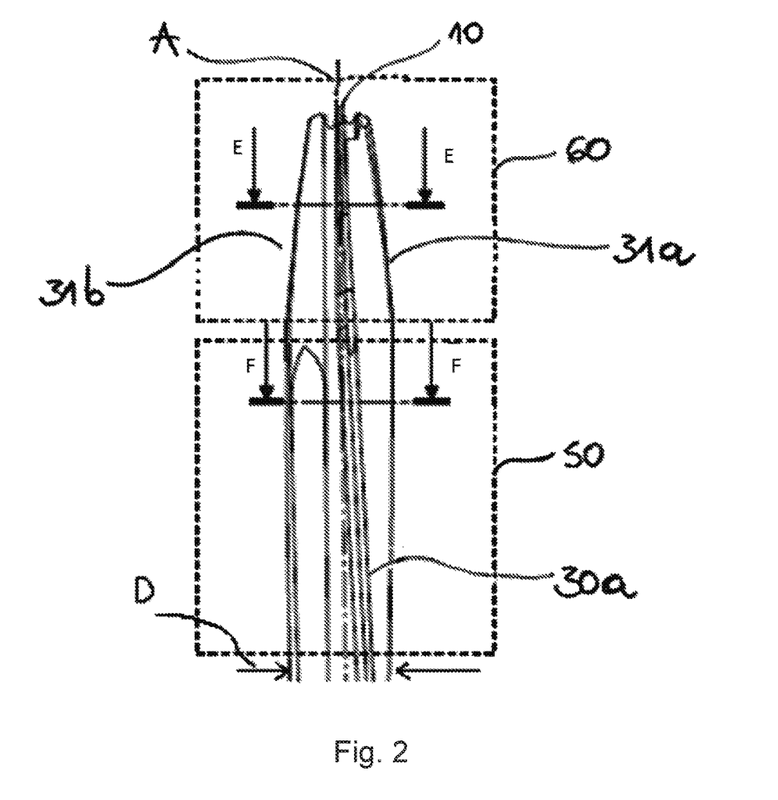
FIG. 2 shows a side view of the details of the drilling tool of FIG. 1.

By firstly referring to FIG. 1, the drilling tool is represented according to FIGS. 1 and 2.

In anyone of the embodiments described hereinafter, the drilling tool according to the present invention can be defined as a drill point which drills and bores.

As shown in FIGS. 1 and 2, the drilling tool 1 in particular apt to drill an element made of composite material or more coupled elements (for example in order to obtain a packet, as described above) has an engagement chuck 2 tightened in the spindle of a tool machine to drag the tool itself in rotation and an elongated point body 3, integral to the above-mentioned chuck.

Figures 3, 4, 5:
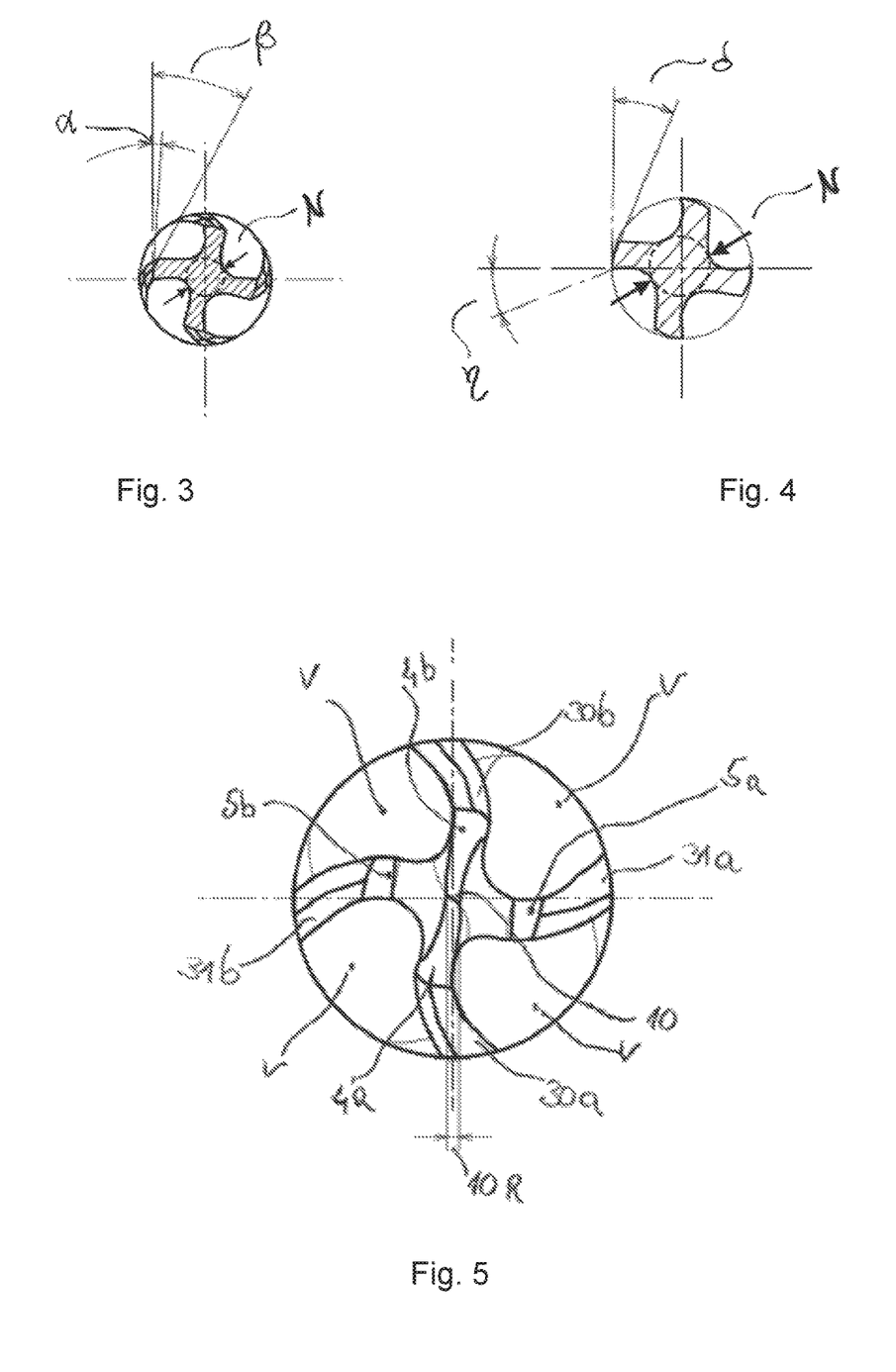
FIG. 3 shows a schematic cross view of the drilling tool of FIG. 1 at the section (E-E)
FIG. 4 shows a schematic section view of the drilling tool of FIG. 1 at the section (F-F)
FIG. 5 shows a top view of the drilling tool of FIG. 1.

In the preferred embodiment, the point body 3 has a tool diameter D and at least four helical grooves "chip compartment V" FIG. 5 which develop longitudinally on the point body towards a distal end of the drilling tool.

The four grooves, in FIG. 5, define at least:

two primary cutters, 30a and 30b, and at least two secondary cutters, 31a and 31b.

Figure 7:
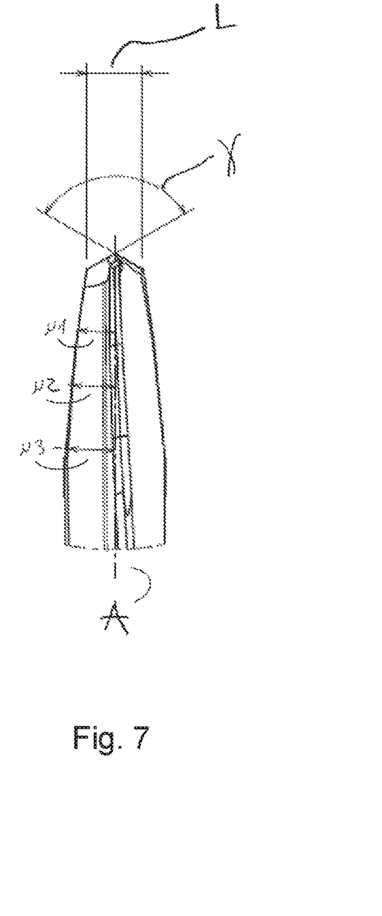
FIG. 7 shows a detail of FIG. 6.
Figure 8:
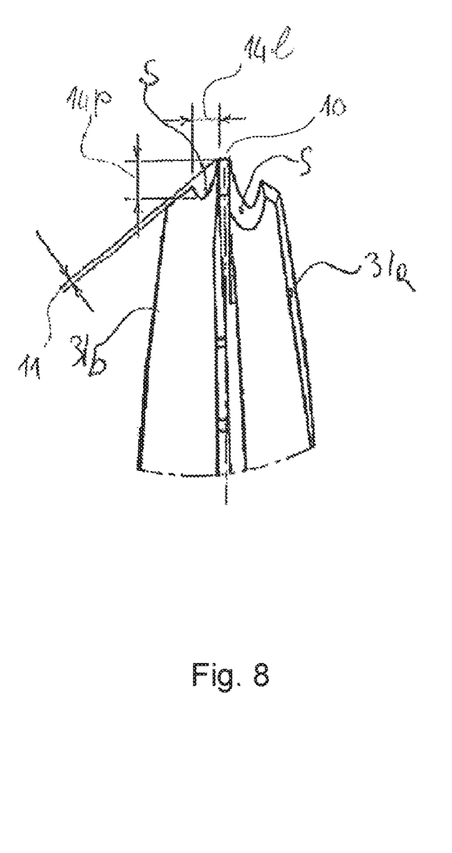
FIG. 8 shows an end detail of the drilling tool of FIG. 2.

The primary cutters, as even shown in FIG. 7, meet to form a tip angle g, in particular comprised in a range between 115 and 125 degrees, for example equal to 120 degrees, at a so-called transversal cutting edge 10 FIG. 8. Advantageously, the tip angle of the two cutters 30a and 30b allows the drilling tool to penetrate in rotation into the material during working.

As shown in FIG. 8, the secondary cutters 31a and 31b have a notch shaped like a "U" creating a discharge surface "S", at the head of the point body, which avoids to clog the point of the cut material, by improving the discharge and reducing the operator's effort.

In particular, such discharge surface S is shaped so as to create an interruption area between the secondary cutters 31a and 31b and the primary cutters 30a and 30b and it is implemented by means of a "U"-like notch one the distal end of the cutters. In particular, the notches are implemented to generate a discharge surface "S" with maximum width 14*l* and maximum depth 14*p*, such sizes being variable with the diameter "D" of the cylindrical portion 50, as better detailed hereinafter in table 1.

In particular, the remaining portions of the secondary cutters 31a 31b are shaped like two side cusps at the distal end of the drilling tool and collaborate to the cut of the main cutters 30a and 30b. For example, the notches implemented on the secondary cutters, allow using such cusp-like portion, thus contributing to the front cut of the working material. The first contact with the material takes place through the primary cutters 30a and 30b, respectively in the cutting areas 4a and 4b. The front drafts 5a and 5b of the secondary cutters 31a and 31b directed towards the material to be cut at the distal end of the drilling tool, respectively the cuspid-like areas, in fact are subjected to the corresponding primary cutters.

The size 11, as shown in FIG. 8, is preferably comprised in a range between about 0.1 and about 0.8 mm, for example equal to 0.3 mm. The size 11 between the primary cutters and the secondary cutters creating together with the size "14*l*" and "14*p*" a discharge area "S" in the cutting area allowing a better discharge of the cut material.

Figure 9:
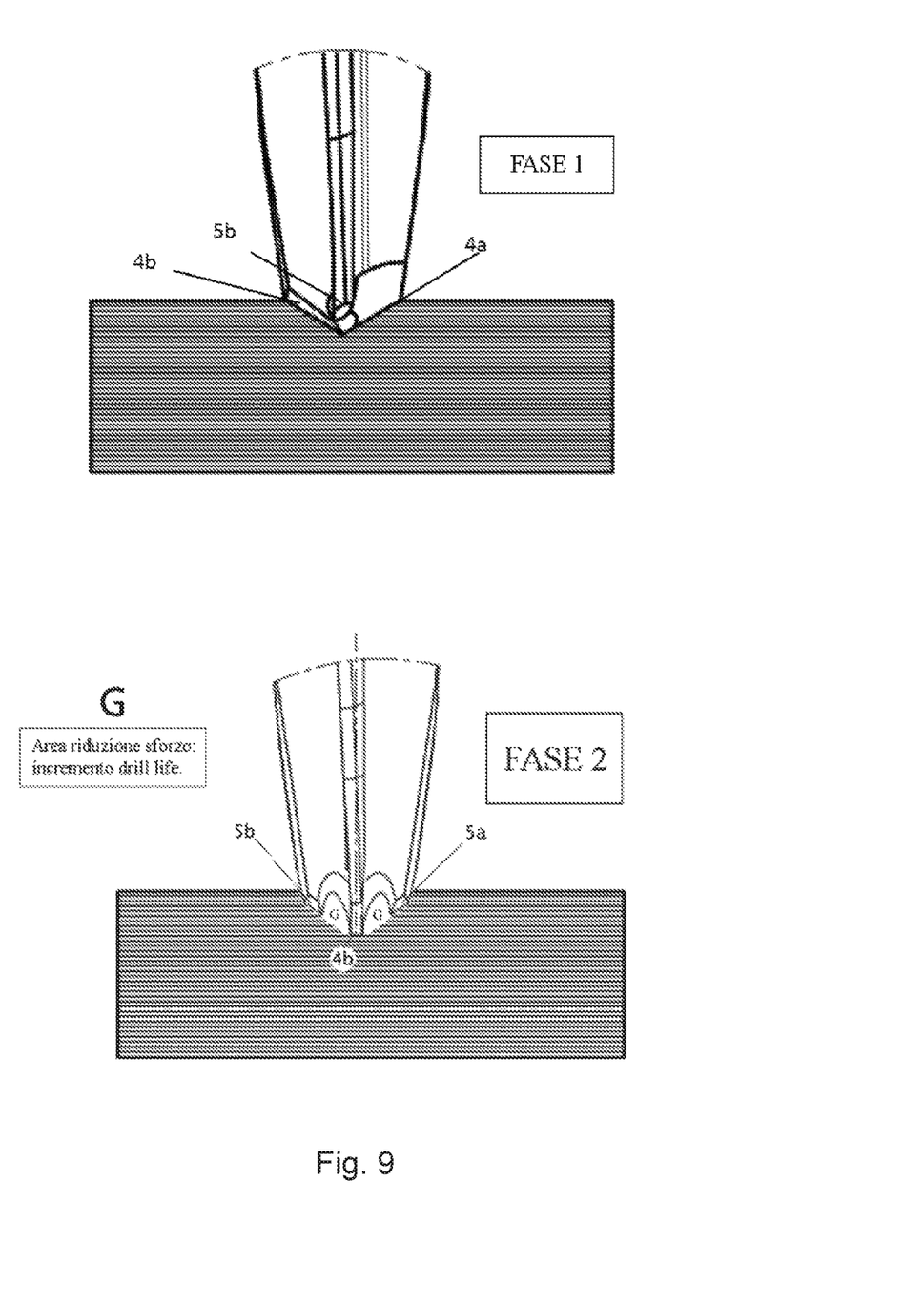
FIG. 9 shows a working example of the drilling tool according to the present invention.

As shown in FIG. 9, (step 1) the approach of the tool on the material takes place on the primary cutters 30a and 30b and the cutting area 4a and 4b. In (step 2) the secondary cutters 31a and 31b, and the cutting areas 5a and 5b, contribute to the cutting and thanks to the discharge area the operator's effort is reduced, the friction between the portions is reduced by minimizing the temperature increase during the cutting and promoting the discharge of the cut material, by increasing the tool life of the tool.

In the described example, the portion of first contact of the tool 1 with the material, is equal to the cutting edge 10 (transversal cutter), such edge 10 is generated by the intersection of the tip cutters 4a and 4b, which have a front draft angle comprised in a range between 25 and 35 degrees, for example equal to 28 degrees.

As highlighted in the figures related to the side views of the drilling tool according to a preferred embodiment, the point body 3 is formed by a first substantially cylindrical portion 50 and a second substantially conical profiled portion 60. The conical portion 60 is tapered towards the distal end of the drilling tool.

Advantageously, the geometrical shape of the tool 1 makes it suitable to allow the drilling of the element by means of a single passage of the tool inside the element itself.

Alternatively, for example for larger diameters the implementation of a number of the cutters higher than four is provided.

Figure 6:
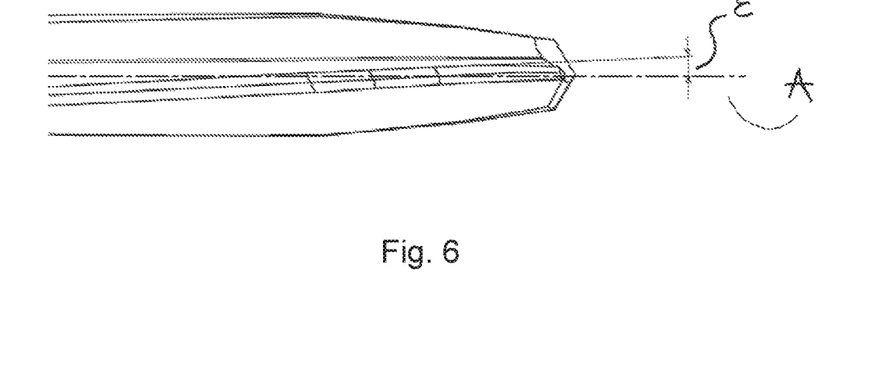
FIG. 6 shows an additional side view of an additional detail of the drilling tool of FIG. 1.

In particular, the above-mentioned cutters develop along a left-hand helix, for example having a helix angle ε shown in FIG. 6 (considered as the angle formed by the tangent to the average helix with an axis of main extension A of the tool 1) in a range from 0.1 to 8 degrees, for example equal to 3 degrees, allows reducing the operator's effort in the drilling working. In an alternative embodiment, the cutters develop along a right-hand helix.

The point body comprises a central web called core therearound the primary and secondary cutters develop. The outer diameter "D" of the cutters defines an outer surface of the point body itself.

Preferably, the second substantially conical portion 60 has at least a coning variation towards the distal end of the drilling tool itself. In particular, to the purposes of the present description, under coning angle of inclination of the diameter reduction is defined, that is the angle formed by the tangent to the outer profile of the cutters with an axis of main extension A of the drilling tool shown in FIG. 7.

In the preferred embodiment, the cutters 30a, 30 b, 31a and 31b form:

a coning angle $\mu 1$, with the main axis "A" of the tool 1, comprised in a range between 2 and 10 degrees, for example equal to 6 degrees, for a length of a first cutter tract comprised between 6 and 14 mm, for example equal to 10 mm, starting from the distal end of the drilling tool;

a coning angle $\mu 2$, with the main axis "A" of the tool 1, comprised in a range between 1 and 7 degrees, for example equal to 4 degrees, for a length of a second cutter tract comprised between 2 and 9 mm, for example equal to 5 mm, starting from the above-mentioned first tract;

a coning angle $\mu 3$, with the main axis "A" of the tool 1, comprised in a range between 0 and 6 degrees, for example equal to 2 degrees, for a length of a third cutter tract comprised between 2 and 9 mm, for example equal to 5 mm, starting from the above-mentioned second tract.

In particular, the combination of the variable helical course of the cutters and of the three conical shapes, $\mu 1$, $\mu 2$, $\mu 3$, according to what described above generates a cutting surface with variable course along the main axis A.

Advantageously, the variable coning degree adopted on the cutters, reduces the axial and radial loads allowing to perform the drilling with extreme ease. Said configuration of cutters allows reducing the operator's effort by facilitating the inletting drilling working.

The conical shape of the portion 60, with particular taper of the central web, called core (N), further allows reducing the cross section of the cutters and making the chuck compartment V deeper, with a greater discharge of the cut material and reducing the overheating of the working material.

As shown in FIG. 3, in the conical portion 60 the cutters 30a, 30b, 31a and 31b have an angle of first dorsal draft α, preferably comprised in a range from 4 to 12 degrees, for example equal to 8 degrees.

Furthermore, in the above-mentioned conical portion 60, FIG. 3, the cutters 30a, 30b, 31a and 31b have an angle of second dorsal draft β, preferably comprised in a range from 25 to 35 degrees, for example equal to 30 degrees.

As shown in FIG. 4, in the first cylindrical portion 50 the cutters 30a, 30b, 31a and 31b have an angle of second dorsal draft δ, preferably comprised in a range from 25 to 35 degrees.

Under the mordent angle in the present description the radial angle is meant generated by the surface of the chuck compartment and the plane normal to the main axis of extension A.

In order to allow a high cutting quality and a drilling working with sharp cut and without rupture of fibres, preferably, in the conical portion 60, the cutters 30a, 30b, 31a and 31b have a variable mordent angle "η" FIG. 4 towards the distal end of the drilling tool. In particular, the values of the mordent angle in the above-mentioned conical area are comprised in a range from −3 to 3 degrees.

In the first cylindrical portion 50 the mordent angle η represented in FIG. 4 preferably is comprised in a range from 3 to 12 degrees. Therefore, at the cylindrical portion 50 a new mordent is generated, this features allows the tool to operate as two different tools. The variation of the mordent angle (from positive to negative) generates the finishing during the same drilling working; then both an improvement of the surface finishing of the hole (stricter tolerances) and a longer duration of the tool result therefrom.

Preferably, even the central web of the drilling tool, called core "N", suffers size variations in the passage from the cylindrical portion to the conical portion. In particular, the diameter of the core (in the first portion 50) has a resistant section having a diameter comprised between about ⅓ and about ⅔ of the diameter of the cylindrical portion 50, in particular variable along the extension direction of the main axis A.

The diameter of the core (in the second conical portion 60) has a resistant section having a diameter comprised between about ¼ and about ½ of the diameter D of the cylindrical portion 50, in particular variable based upon the considered length. Therefore, the core "N" of the point body 3 decreases towards the distal end of the tool of first contact with the element to be drilled. The thickness of the cutting edge (10 R) is defined based upon the thickness of the diameter "D", as shown hereinafter in table 1 (FIG. 5).

As shown in FIG. 7, the maximum width L of the primary cutters 30a and 30b at the distal end of the tool is about ⅓ and ⅔ of the diameter D of the cylindrical portion.

In particular, the combination of the above-mentioned values related both to the width of the cutters 30a and 30b, and to the front draft angle 4a and 4b and to the angles α of first dorsal draft, favours a minimum contact between the material and the tool so as to reduce the friction between the portions and consequently to minimize the increase in temperature during cutting. Advantageously, then, it is possible performing drilling with high thicknesses without burning and/or deformation of material.

According to the specific type of considered material and/or of the specific sizes of the required working, tools with different diameters are used. Preferably, some geometrical features of the tool, according to the present invention, are variable depending upon the value of the diameter D of the cylindrical portion, as shown in table 1 below.

TABLE 1

| Description | Area; Reference | Tool Diameter D (") | | | |
|---|---|---|---|---|---|
| | | 6/32" Value (mm) | 8/32" Value (mm) | 10/32" Value (mm) | 12/32" Value (mm) |
| Core conical Tract | Under core the point central web is meant. | ¼~½ D | ¼~½ D | ¼~½ D | ¼~½ D |
| Core cylindrical Tract | Under core the point central web is meant. | ⅓~⅔ D | ⅓~⅔ D | ⅓~⅔ D | ⅓~⅔ D |
| Engraving of cutters | Division of the secondary cutters S: Width (14 l), Depth (14 p, | (14 l) 0.2~0.8 (14 p) 0.6~1.4 | 0.4~1.2 0.6~1.4 | 0.6~1.4 0.8~1.6 | 0.4~1.6 1.2~2 |
| Width of the main cutters | L | ⅓~⅔ D | ⅓~⅔ D | ⅓~⅔ D | ⅓~⅔ D |
| Reduction core head | 10R | 0.2~1 | 0.2~1 | 0.4~1.3 | 0.4~1.5 |

The field of the hand drilling requires a complex sequence of procedures depending upon the cases to obtain the finished hole, that is depending upon the type of material to be worked, or of the different types of material in case of couplings of different materials.

The drilling tool according to the present invention has obtained excellent results. The operator's effort has been reduced considerably notwithstanding the difficulties in working materials with different mechanical features.

An additional advantage of the drilling tool according to the present invention is that the tool works both in absence of lubricant and moistened on the distal end of the tool with cutting lubricating wax or lubricant oil.

As described, in order to complete the above-mentioned drilling working through the known art a plurality of tools, a plurality of bushings (guides for the tool), and a plurality of tool exchanges (with consequent need of time for the passage between two applications) would be required.

Advantageously, by means of using the drilling tool according to the present invention, in order to obtain a complete drilling procedure, one single tool will be required, time and production costs linked to the tool exchange are not provided and at last one will require to provide:

For example, as far as the working time is concerned, the time exclusively inherent to the drilling procedure is:

Tcu: time for changing tool
Tl: working time
Tt: total time (Tt=Tcu+Tl)

By means of using the drilling tool according to the present invention a reduction in time for changing tool, a clear reduction in time for drilling and then a reduction of Tt is obtained. The considerable reduction in time and production costs for hand working has great importance since the hand procedures up to now are a considerable cost to be reduced in the aviation industry.

In particular, in the aviation field, for each squared meter of material a number of application ranging from 180 to 250, depending upon the specific type of aircraft being manufactured, can be required.

Figure 10:
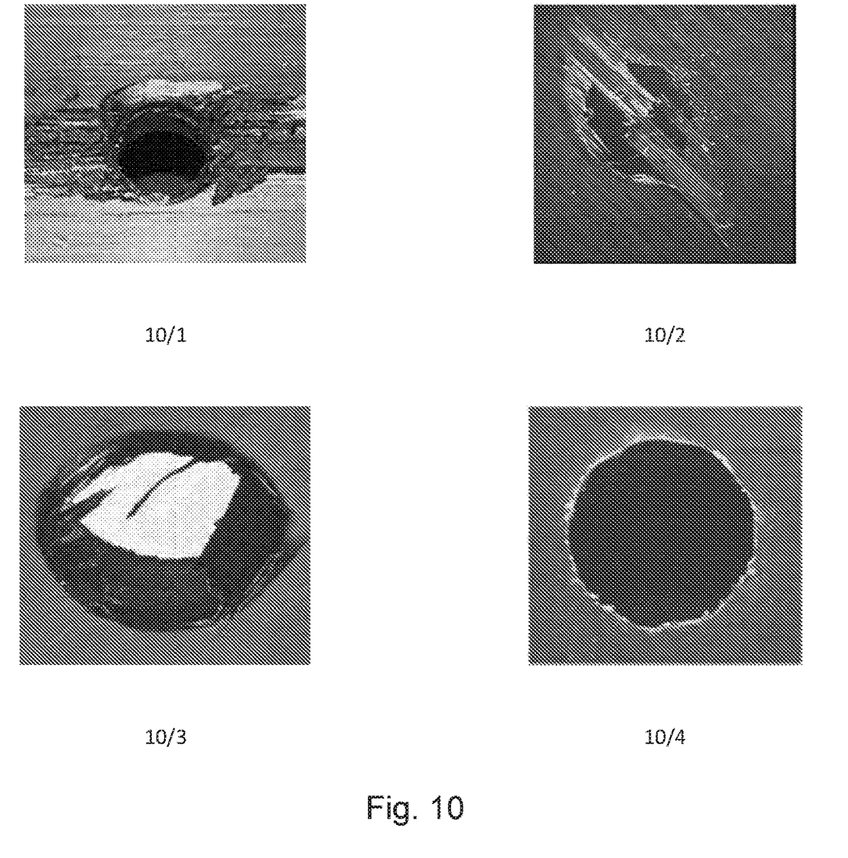
FIG. 10 shows an example of holes performed with traditional tools.
Figure 11:
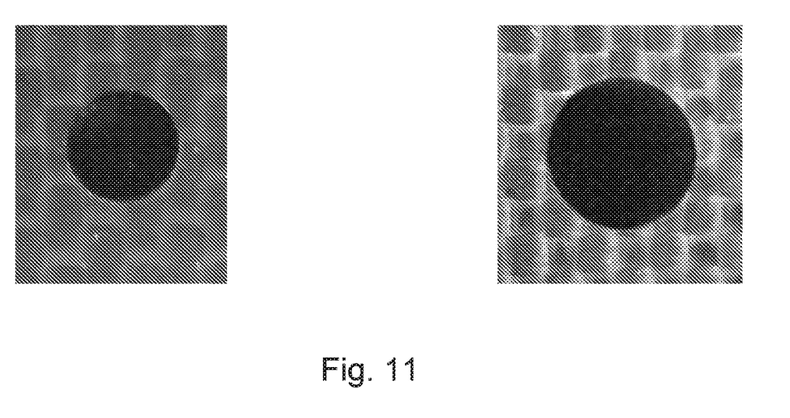
FIG. 11 shows an example of holes performed with the drilling tool according to the present invention.
Figure 12:
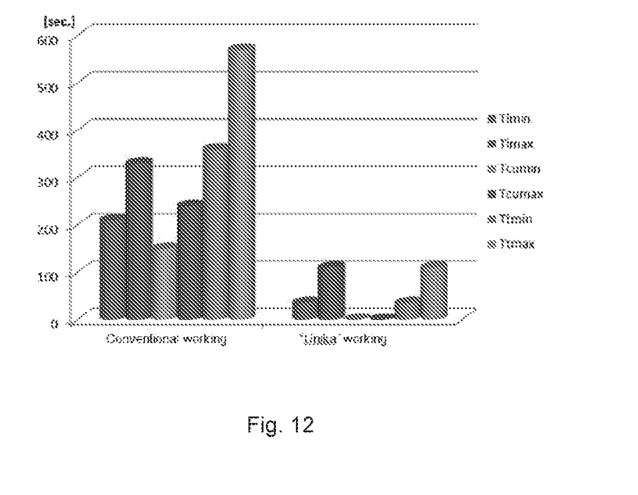
FIG. 12 shows a reduction in drilling time of the drilling tool.
Figure 13:
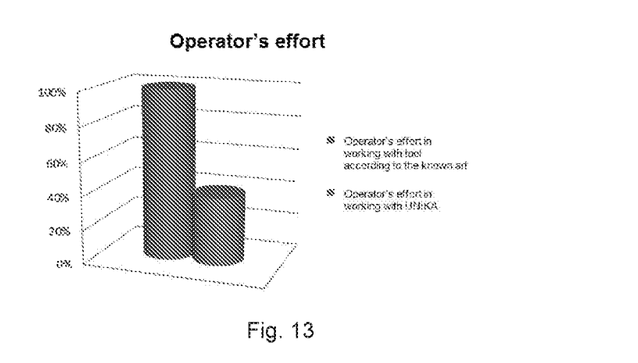
FIG. 13 shows reduction in operator's effort.
Figure 14:
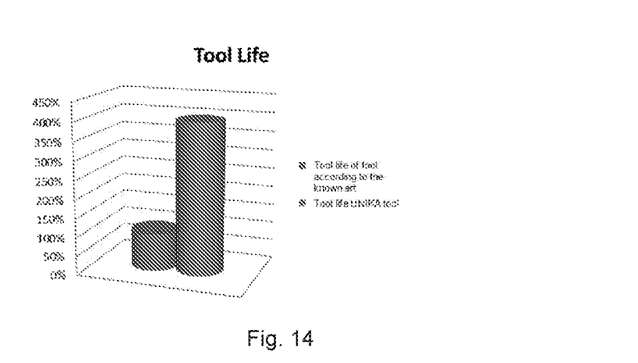
FIG. 14 shows increase in the drilling tool life.

The rotating drilling tool (hand drilling with hand tool) can perform continuously about 300% of holes more than the known art on an element or more elements made of composite material with thickness larger than 10 mm. In the images of FIG. 10 some holes are represented by using traditional tools with detectable defects. With the device of the present invention there is not only an increase in the tool life, but the quality requirements are respected (FIG. 11).

In order to perform a drilling by means of the device of the present invention it will be then sufficient to equip with a tool machine, for example a drill (Hand Tool), comprising the tool mentioned above, a guiding bushing, to position the distal end of the tool at a surface portion of the working element and to actuate and push the drill towards the element itself to perform a through-hole.

Therefore, the importance of the drilling tool according to the present invention and of the process associated thereto in terms of costs and above-all in terms of performing time is evident.

The drilling tool according to the present invention allows overcoming the need of a range of helical points and boring machines for performing the work in a progressive way, typical of the known art. By overcoming a working comprising a plurality of passes with increasing diameters and final pass with boring machine, the working errors are wholly annulled.

Therefore, by means of using the drilling tool according to the present invention, an improvement of the drilling working is obtained in terms of ergonomics, size tolerance, surface quality, time and production costs.

The present invention has been so far described with reference to preferred embodiments. It is to be meant that other embodiments belonging to the same inventive core may exist, as defined by the protection scope of the herebelow reported claims.

What is claimed is:

1. A manual drilling tool for drilling one or more coupled elements, comprising:
   an engagement chuck adapted to be tightened in the spindle of a tool machine to drag said tool in rotation;
   a point body with tool diameter having at least four helical grooves developing longitudinally on the point body and defining at least two primary cutters and at least two secondary cutters; said two primary cutters forming a tip angle said secondary cutters having a discharge surface; said discharge surface being shaped so as to create an interruption between the secondary cutters and the primary cutters by contributing to reduce the operator's effort, to reduce the temperature and to promote the discharge of the worked material, wherein said point body is formed by a substantially cylindrical first portion and a substantially conical second portion with taper towards the end of the tool, which manual drilling tool provides three different coning angles defined as angles formed by tangents to outer profiles of the cutters with an axis of main extension of the drilling tool, wherein said primary and secondary cutters form:
   a coning angle comprised in a range between 2 and 10 degrees for a length of a first cutter tract comprised between 6 and 14 mm starting from the distal end of the drilling tool;
   a coning angle comprised in a range between 1 and 7 degrees for a length of a second cutter tract comprised between 2 and 9 mm starting from the above-mentioned first cutter tract; and
   a coning angle comprised in a range between 0 and 6 degrees for a length of a third cutter tract comprised between 2 and 9 mm starting from the above-mentioned second tract.

2. The drilling tool according to claim 1, wherein said secondary cutters have a discharge surface, generated by a "U"-like notch, with a width and a depth on both secondary cutters variable based upon the diameter of said cylindrical portion, this geometrical shape being configured to contribute to further reduce the operator's effort, the temperature and to promote the discharge of the worked material.

3. The drilling tool according to claim 1, wherein a frontal distance between said primary and said secondary cutters, at said distal end of the tool, is substantially comprised in a range from about 0.1 to about 0.8 mm.

4. The drilling tool according to claim 1, said two primary cutters having two respective areas generated by a front draft angle comprised in a range between 25 and 35 degrees.

5. The drilling tool according to claim 1, wherein said grooves develop along a left-hand helix.

6. The drilling tool according to claim 1, wherein said cutters develop along a helix having a helix angle comprised in a range from 0.1 to 8 degrees.

7. The drilling tool according to claim 1, wherein said cutters in said substantially cylindrical first portion have an angle of second dorsal draft comprised in a range from 25 to 35 degrees.

8. The drilling tool according to claim 1, wherein said cutters in said second substantially conical portion have a positive angle of first dorsal draft comprised in a range from 4 to 12 degrees.

9. The drilling tool according to claim 1, wherein said cutters in said second substantially conical portion have a positive angle of second dorsal draft comprised in a range from 25 to 35 degrees.

10. The drilling tool according to claim 1, wherein said cutters in said second substantially conical portion have a variable mordent angle along a direction of main development of the axis of the tool.

11. The drilling tool according to claim 10, wherein said variable mordent angle is comprised in a range from −3 to 3 degrees.

12. The drilling tool according to claim 1, wherein said cutters in said first substantially cylindrical portion have a mordent angle comprised in a range from 3 to 12 degrees.

13. The drilling tool according to claim 1, wherein said central web or core in said first cylindrical portion has a resistant section having a diameter comprised in a range between about ⅓ and about ⅔ of the diameter of said cylindrical portion, preferably variable along a direction of main development of the axis of the tool.

14. The drilling tool according to claim 1, wherein said central web or core in said second portion has a resistant section having a diameter comprised in a range between about ¼ and about ½ of the diameter of said cylindrical portion, preferably variable based upon the considered height.

15. The drilling tool according to claim 1, wherein said tip angle is substantially comprised in a range between 115 and 125 degrees.

16. The drilling tool according to claim 1, wherein a maximum width of said primary cutters at said distal end of the point has a value comprised in a range between about ⅓ and about ⅔ of the diameter of said cylindrical portion.

17. The drilling tool according to claim 1, wherein said chuck can be received in numerical control half-automatic and automatic hand machine tools.

18. The drilling tool according to claim 1, wherein one or more coupled elements are made of composite material, such as for example carbon fibre and/or glass fibre.

19. The drilling tool according to claim 1, wherein one or more coupled elements are made of light alloy and/or titanium alloy and/or plastic materials.

* * * * *